United States Patent
Bosio

(10) Patent No.: US 12,436,151 B2
(45) Date of Patent: Oct. 7, 2025

(54) CONJUGATES HAVING AN ENZYMMATICALLY RELEASABLE DETECTION MOIETY AND A BARCODE MOIETY

(71) Applicant: Miltenyi Biotec B.V. & Co. KG, Bergisch Gladbach (DE)

(72) Inventor: Andreas Bosio, Cologne (DE)

(73) Assignee: Miltenyi Biotec B.V. & Co. KG, Bergisch Gladbach (DE)

( * ) Notice: Subject to any disclaimer, the term of this patent is extended or adjusted under 35 U.S.C. 154(b) by 1031 days.

(21) Appl. No.: 17/601,054

(22) PCT Filed: Apr. 6, 2020

(86) PCT No.: PCT/EP2020/059747
§ 371 (c)(1),
(2) Date: Oct. 1, 2021

(87) PCT Pub. No.: WO2020/207963
PCT Pub. Date: Oct. 15, 2020

(65) Prior Publication Data
US 2022/0206005 A1    Jun. 30, 2022

(30) Foreign Application Priority Data
Apr. 12, 2019 (EP) .................... 19168839

(51) Int. Cl.
| | |
|---|---|
| *G01N 31/00* | (2006.01) |
| *C40B 30/04* | (2006.01) |
| *G01N 33/53* | (2006.01) |
| *G01N 33/58* | (2006.01) |

(52) U.S. Cl.
CPC ............. *G01N 33/58* (2013.01); *C40B 30/04* (2013.01); *G01N 2458/10* (2013.01)

(58) Field of Classification Search
None
See application file for complete search history.

(56) References Cited

U.S. PATENT DOCUMENTS

| | | |
|---|---|---|
| 7,776,562 B2 | 8/2010 | Busch et al. |
| 9,388,456 B2 | 7/2016 | Matthiesen |
| 9,388,465 B2 | 7/2016 | Hindson et al. |
| 9,695,468 B2 | 7/2017 | Hindson et al. |
| 2011/0039717 A1 | 2/2011 | Kwong |

FOREIGN PATENT DOCUMENTS

| | | | |
|---|---|---|---|
| EP | 3037821 A1 | 7/2023 | |
| WO | WO 2016/145416 | 9/2016 | |
| WO | WO-2016145415 A1 * | 9/2016 | ........... C12Q 1/6816 |
| WO | WO-2016145416 A2 * | 9/2016 | ........... C12Q 1/6809 |

OTHER PUBLICATIONS

Wang et al. (Vaccine. Sep. 14, 2010; 28(40): 6613-6620). (Year: 2010).*

* cited by examiner

*Primary Examiner* — Lisa V Cook
(74) *Attorney, Agent, or Firm* — Jaquelin K. Spong

(57) ABSTRACT

The invention is directed to a conjugate having the general formula (I)

$$X_n—P—Y_mB_o \qquad (I)$$

with X is an detection moiety,
P is a spacer unit,
Y an antigen recognizing moiety,
B an oligonucleotide comprising 2 to 100 nucleotide residues
and n, m, o are independent integers between 1 and 100
wherein P and B are covalently bound to Y and X is covalently bound to P and wherein X is erasable.
Further, the invention is directed to a library of such conjugates and a method of detecting target cells utilizing the conjugates or the library of conjugates.

12 Claims, No Drawings

CONJUGATES HAVING AN ENZYMMATICALLY RELEASABLE DETECTION MOIETY AND A BARCODE MOIETY

CROSS REFERENCE TO RELATED APPLICATIONS

This is a non-Provisional Patent application claiming priority to PCT/EP2020/059747 filed 6 Apr. 2020, which in turn claims priority to European patent application EP19168839.9 filed 12 Apr. 2019.

STATEMENT REGARDING FEDERALLY SPONSORED RESEARCH

Not applicable.

STATEMENT REGARDING MICROFICHE APPENDIX

Not applicable.

BACKGROUND

The present invention is directed to a conjugate comprising a detection moiety and an antigen recognizing moiety optionally linked via an enzymatically degradable spacer, wherein the antigen recognizing moiety is provided with an oligonucleotide as barcode and the use of such conjugates for detection or identification of target moieties or target cells or from a cell sample.

Cell detection with conjugates which can be removed from the cells after detection is a known process. For example, U.S. Pat. No. 7,776,562 discloses a reversible fluorescence labeling process wherein the conjugate is removed from the cell by adding competitor molecules breaking up non-covalent bounds in the conjugate.

A different approach to reversible fluorescence labeling is disclosed in EP3037821A1 wherein the conjugate is provided with an enzymatically degradable spacer. By adding the appropriate enzyme, the conjugate is destroyed and both the detection moiety and the antigen recognizing moiety of the conjugate are removed from the cell.

The known processes enable detection of different cells within a cell sample. For example, it is possible to detect or distinguish several phenotypes of cells and their location in a tissue by repeatedly staining, detecting and destaining with conjugates having different antigen recognizing moieties.

It is, however not possible to analyze the genetic information of a single, isolated cell In a different field of technology, it is known to identify genetic information obtained from a single cell by conjugating the cell with a polynucleotide as barcode. These method involve synthesizing a library of different polynucleotides which can be sequenced in order to identify a single cell.

The biology and the necessary hardware to isolate cells is for example disclosed in U.S. Pat. No. 9,388,456 or U.S. Pat. No. 9,695,468. However, this technology is focused on single, isolated cells rather than cells in the context of a tissue or cell culture involving cell-cell interaction.

SUMMARY

It was therefore an object of the invention to provide a conjugate which enables the identification of single cells and their position/location on or within a tissue as well as their phenotype. Further, the means for identification shall be erasable to allow multiple identification steps.

It was found that conjugates composed of an antigen binding moiety coupled to a) a barcode moiety and b) to a detection moiety which can be erased are suitable for single cell identification.

Due to the erasable detection moiety, the biological specimen can be subjected to the same or a different conjugate again without interference of the respective previous label. All barcode moieties remain on the cell and thereby enable via sequencing the linkage between the phenotype of a cell as detected by binders and the genetic information of a single cell as detected by sequencing.

Object of the invention is therefore a conjugate having the general formula (I)

$$X_n-P-Y_mB_o \quad (I)$$

with X is an detection moiety,
P is a spacer unit,
Y an antigen recognizing moiety,
B an oligonucleotide comprising 2 to 100 nucleotide residues and n, m, o are independent integers between 1 and 100
wherein P and B are covalently bound to Y and X is covalently bound to P and wherein X is erasable.

In a preferred embodiment, the spacer unit P is enzymatic degradable.

Yet another object of the invention is a method for detecting a target moiety on a cell by:
a) providing at least one conjugate having the general formula (I)

$$X_n-P-Y_mB_o \quad (I)$$

with X is an detection moiety,
P is a spacer unit,
Y an antigen recognizing moiety,
B an oligonucleotide comprising 2 to 100 nucleotide residues and n, m, o are independent integers between 1 and 100
wherein P and B are covalently bound to Y and X is covalently bound to P and wherein X is erasable
b) contacting the sample of biological specimens with the at least one conjugate, thereby labelling the target moiety recognized by the antigen recognizing moiety Y
c) detecting the target moiety labelled with the conjugate with the detecting moiety X
d) isolating the cell labelled with the conjugate with the detecting moiety X
e) erasing detection moiety X.

DETAILED DESCRIPTION

The terms "covalent bound" refers to bonds having a dissociation constant of ≤10-9 M. The term "erasing detection moiety X" refers to the elimination of a fluorescence emission by X. This can be either achieved by eliminating the capability of X to be detected, for example in case of X as one of chromophore moiety, fluorescent moiety, phosphorescent moiety, luminescent moiety, light absorbing moiety by destroying or degrading the chemical nature of X in a way that upon excitation on X, no emission is detectable.

Such destroying or degrading the chemical nature of X can be achieved for example by enzymatic degradation, radiation or oxidative bleaching. The necessary chemicals for bleaching are known from the above-mentioned publications on "Multi Epitope Ligand Cartography", "Chipbased Cytometry" or "Multioymx" technologies.

A further way of "erasing detection moiety X" is to remove X from the conjugate. This may be achieved by providing the conjugate according to general formula (I) with an enzymatically degradable spacer unit P. When enzymatically degradable spacer P is digested by adding (after detection of X) an appropriate enzyme, X is no longer bound to the conjugate and can be removed for example by washing.

Depending on the nature of antigen recognizing moiety Y, this embodiment may have the effect that after enzymatically degrading spacer P, the antigen recognizing moiety Y is or can be removed from the antigen, leaving the target cells untouched. Antigen recognizing moieties Y which need several binding sites to provide a stable bound to the antigen like FABs are prone to be removed from the antigen upon enzymatically degrading spacer P.

If removing antigen recognizing moiety Y from the antigen is not desired, this can be prevented by a further embodiment of the invention, wherein the antigen recognizing Y and/or the oligonucleotide B is provided with a crosslinker unit capable of providing a covalent bound to the antigen recognized by antigen recognizing moiety Y.

The covalent bound of the crosslinker to an antigen may be initiated by radiation or enzymatic reaction.

The method of the invention i.e. steps a) to e) may be repeated subsequently at least with two conjugates having different antigen recognizing moieties Y. In alternative, steps a) to e) can be repeated subsequently at least with two conjugates having different antigen recognizing moieties Y and different oligonucleotides B.

In further embodiments of the invention, steps a) to e) are repeated at least once, in addition to the following steps
f) isolating the cell labelled with at least 2 conjugates with the detecting moiety X
g) lysing the cell
h) adding to the oligo B a second barcode
i) adding to the genetic information of the cell the same second barcode (wherein
g) and h) may be performed simultaneously and h) and i) may be performed in alternative sequence.)

Optionally, step h) may be performed by hybridizing an antisense oligonucleotide to a sequence represented in the genetic information and the oligo B, whereby the antisense Oligonucleotide is covalently linked to a second barcode. An oligonucleotide B' comprising 2 to 100 nucleotide residues may be used as second barcode Preferentially, an Oligo(dT) containing oligonucleotide is used to hybridize with the poly(A) of the mRNAs of said cell and with an oligo(dA) sequence stretch included in Oligo B, whereby the Oligo(dT) is covalently linked to a second barcode.

Target Moiety

The target moiety to be detected with the method of the invention can be on any biological specimen, like tissues slices, cell aggregates, suspension cells, or adherent cells. The cells may be living or dead. Preferable, target moieties are antigens expressed intracellular or extracellular on biological specimen like whole animals, organs, tissues slices, cell aggregates, or single cells of invertebrates, (e.g., *Caenorhabditis elegans, Drosophila melanogaster*), vertebrates (e.g., *Danio rerio, Xenopus laevis*) and mammalians (e.g., *Mus musculus, Homo sapiens*).

Barcode Moiety

In the present application, oligonucleotides B with different sequences are referred to as "barcode" since they allow identifying a single target by their unique sequence. The barcode moiety B comprises an oligonucleotide comprising 2 to 100 nucleotide residues, preferable 5 to 70 nucleotide residues. As nucleotide residues, the naturally occurring cytosine (C), adenine (A), guanine (G) and thymine (T) are preferred. By randomly polymerizing these units, a library of oligonucleotides with different sequences can be obtained. For example, a library randomly producing oligonucleotides comprising 10 nucleotide residues will have $4^{10}=1048576$ members.

The technique to produce oligonucleotides and libraries thereof is well known to a person skilled in the art, as well as the technologies to amplify isolated oligonucleotides to obtain larger amounts thereof. U.S. Pat. No. 9,388,465 summarizes these technologies.

Accordingly, it is a further object of the invention to provide a library of conjugates as already discussed comprising at least 10000 conjugates provided with oligonucleotides B having different sequences.

Detection Moiety

The detection moiety X of the conjugate may be any moiety possessing a property or function which can be used for detection purposes like those selected from the group consisting of chromophore moiety, fluorescent moiety, phosphorescent moiety, luminescent moiety, light absorbing moiety, radioactive moiety, and transition metal isotope mass tag moiety.

Suitable fluorescent moieties are those known from the art of immunofluorescence technologies, e.g., flow cytometry or fluorescence microscopy. In these embodiments of the invention, the target moiety labelled with the conjugate is detected by exciting the detection moiety X and detecting the resulting emission (photoluminescence). In this embodiment, the detection moiety X is preferable a fluorescent moiety.

Useful fluorescent moieties might be protein-based, such as phycobiliproteins, polymeric, such as polyfluorenes, small organic molecule dyes, such as xanthenes, like fluorescein, or rhodamines, cyanines, oxazines, coumarins, acridines, oxadiazoles, pyrenes, pyrromethenes, or metallo-organic complexes, such as Ru, Eu, Pt complexes. Besides single molecule entities, clusters of fluorescent proteins or small organic molecule dyes, as well as nanoparticles, such as quantum dots, upconverting nanoparticles, gold nanoparticles, dyed polymer nanoparticles can also be used as fluorescent moieties.

Another group of photoluminescent detection moieties are phosphorescent moieties with time-delayed emission of light after excitation. Phosphorescent moieties include metallo-organic complexes, such as Pd, Pt, Tb, Eu complexes, or nanoparticles with incorporated phosphorescent pigments such as lanthanide doped $SrAl_2O_4$.

In another embodiment of the invention the target labelled with the conjugate is detected without prior excitation by irradiation. In this embodiment the detection moiety can be a radioactive label. They may be in the form of radioisotope labeling by exchanging non-radioactive isotopes for their radioactive counterparts, such as tritium, $^{32}P$, $^{35}S$ or $^{14}C$, or introducing covalently bound labels, such as $^{125}I$, which is bound to tyrosine, $^{18}F$ within fluorodeoxyglucose, or metallo-organic complexes, i.e. $^{99}Tc$-DTPA.

In another embodiment the detection moiety is capable of causing chemiluminescence, i.e. horseradish peroxidase label in the presence of luminol.

In another embodiment of the invention the target labelled with the conjugate is not detected by radiation emission, but by absorption of UV, visible light, or NIR radiation. Suitable light-absorbing detection moieties are light absorbing dyes without fluorescence emission, such as small organic molecule quencher dyes like N-aryl rhodamines, azo dyes, and stilbenes.

In another embodiment, the light-absorbing detection moieties X can be irradiated by pulsed laser light, generating an photoacoustic signal.

In another embodiment of the invention the target labelled with the conjugate is detected by mass spectrometric detection of a transition metal isotope. Transition metal isotope mass tag labels might be introduced as covalently bound metallo-organic complexes or nanoparticle component. Known in the art are isotope tags of lanthanides and adjacent late transition elements.

The detection moiety X can be covalently coupled to the spacer P by a direct reaction of an activated group either on the detection moiety or on the spacer P with an functional group on either the spacer P or on the detection moiety X or via an heterobifunctional linker molecule, which is firstly reacted with one and secondly reacted with the other binding partner.

For example, a large number of heterobifunctional compounds are available for linking to entities. Illustrative entities include: azidobenzoyl hydrazide, N-[4-(p-azidosalicylamino) butyl]-3'-[2'-pyridyldithio]propionamide), bis-sulfosuccinimidyl suberate, dimethyladipimidate, disuccinimidyltartrate, N-γ-maleimidobutyryloxysuccinimide ester, N-hydroxy sulfosuccinimidyl-4-azidobenzoate, N-succinimidyl [4-azidophenyl]-1,3'-dithiopropionate, N-succinimidyl [4-iodoacetyl]aminobenzoate, glutaraldehyde, succinimidyl-[(N-maleimidopropionamido) polyethyleneglycol] esters (NHS-PEG-MAL), and succinimidyl 4-[N-maleimidomethyl]cyclohexane-1-carboxylate. A preferred linking group is 3-(2-pyridyldithio) propionic acid N-hydroxysuccinimide ester (SPDP), or 4-(N-maleimidomethyl)-cyclohexane-1-carboxylic acid N-hydroxysuccinimide ester (SMCC) with a reactive sulfhydryl group on the detection moiety and a reactive amino group on the spacer P.

A quasi-covalent binding of the detection moiety X to the spacer P can be achieved with binding systems providing a dissociation constant of ≤10-9 M, e.g., Biotin-Avidin binding interaction.

Spacer P

In general, any spacer P may be used which is known for in the art of antigen-recognizing conjugates, like LCLC or PEG oligomers.

In a preferred embodiment, the conjugate according to the invention comprises a spacer unit P, which is enzymatic degradable. The enzymatically degradable spacer P can be any molecule which can be cleaved by a specific enzyme, especially a hydrolase. Suitable as enzymatically degradable spacer P are, for example, polysaccharides, proteins, peptides, depsipeptides, polyesters, nucleic acids, and derivatives thereof.

Suitable polysaccharides are, for example, dextrans, *pullulans*, inulins, amylose, cellulose, hemicelluloses, such as xylan or glucomannan, pectin, chitosan, or chitin, which may be derivatized to provide functional groups for covalent or non-covalent binding of the detection moiety X and the antigen recognizing moiety Y. A variety of such modifications are known in the art, for example, imidazolyl carbamate groups may be introduced by reacting the polysaccharide with N,N'-carbonyl diimidazole. Subsequently amino groups may be introduced by reacting said imidazolyl carbamate groups with hexane diamine. Polysaccharides may also be oxidized using periodate to provide aldehyde groups or with N,N'-dicyclohexylcarbodiimide and dimethylsulfoxide to provide ketone groups. Aldehyde or ketone functional groups can be reacted subsequently preferably under conditions of reductive amination either with diamines to provide amino groups or directly with amino substituents on a proteinaceous binding moiety. Carboxymethyl groups may be introduced by treating the polysaccharide with chloroacetic acid. Activating the carboxy groups with methods known in the art which yield activated esters such N-hydroxysuccinimid ester or tetrafluorophenyl ester allows for reaction with amino groups either of a diamine to provide amino groups or directly with an amino group of a proteinaceous binding moiety. It is generally possible to introduce functional group bearing alkyl groups by treating polysaccharides with halogen compounds under alkaline conditions. For example, allyl groups can be introduced by using allyl bromide. Allyl groups can further be used in a thiol-ene reaction with thiol bearing compounds such as cysteamine to introduce amino groups or directly with a proteinaceous binding moiety with thiol groups liberated by reduction of disulfide bonds or introduced by thiolation for instance with 2-iminothiolane.

Proteins, peptides, and depsipeptides used as enzymatically degradable spacer P can be functionalized via side chain functional groups of amino acids to attach detection moiety X and antigen recognizing moiety Y. Side chains functional groups suitable for modification are for instance amino groups provided by lysine or thiol groups provided by cysteine after reduction of disulfide bridges.

Polyesters and polyesteramides used as enzymatically degradable spacer P can either be synthesized with co-monomers, which provide side chain functionality or be subsequently functionalized. In the case of branched polyesters functionalization can be via the carboxyl or hydroxyl end groups. Post polymerization functionalization of the polymer chain can be, for example, via addition to unsaturated bonds, i.e. thiolene reactions or azide-alkine reactions, or via introduction of functional groups by radical reactions.

Nucleic acids used as enzymatically degradable spacer P are preferably synthesized with functional groups at the 3' and 5' termini suitable for attachment of the detection moiety X and antigen recognizing moiety Y. Suitable phosphoramidite building blocks for nucleic acid synthesis providing for instance amino or thiol functionalities are known in the art.

The enzymatically degradable spacer P can be composed of more than one different enzymatically degradable units, which are degradable by the same or different enzyme.

Antigen Recognizing Moiety Y

The term "antigen recognizing moiety Y" refers to any kind of antibody, fragmented antibody or fragmented antibody derivatives, directed against the target moieties expressed on the biological specimens, like antigens expressed intracellular or extracellular on cells. The term relates to fully intact antibodies, fragmented antibody or fragmented antibody derivatives, e.g., Fab, Fab', F(ab')2, sdAb, scFv, di-scFv, nanobodies. Such fragmented antibody derivatives may be synthesized by recombinant procedures including covalent and non-covalent conjugates containing these kind of molecules. Further examples of antigen recognizing moieties are peptide/MHC-complexes targeting TCR molecules, cell adhesion receptor molecules, receptors for costimulatory molecules, artificial engineered binding molecules, e.g., peptides or aptamers which target, e.g., cell surface molecules.

The conjugate used in the method of the invention may comprise up to 100, preferable 1-20, preferable 2 to 10 antigen recognizing moieties Y.

The interaction of the antigen recognizing moiety with the target antigen can be of high or low affinity. Binding interactions of a single low-affinity antigen recognizing moiety is too low to provide a stable bond with the antigen. Low-affinity antigen recognizing moieties can be multimerized by conjugation to the enzymatically degradable spacer P to furnish high avidity. When the spacer P is enzymatically cleaved or degraded, the low-affinity antigen recognizing moieties will be monomerized which results in a complete removal of the detection moiety X, the spacer P and the antigen recognizing moiety Y. High-affinity antigen recognizing moieties provide a stable bond which results in a removal of the detection moiety X and the spacer P.

Preferable, the term "Antigen recognizing moiety Y" refers to an antibody directed against antigen expressed by the biological specimens (target cells) intracellular, like IL2, FoxP3, CD154, or extracellular, like CD3, CD14, CD4, CD8, CD25, CD34, CD56, and CD133.

The antigen recognizing moieties Y, especially antibodies, can be coupled to the spacer P through side chain amino or sufhydryl groups. In some cases the glycosidic side chain of the antibody can be oxidized by periodate resulting in aldehyde functional groups.

The antigen recognizing moiety Y can be covalently or non-covalently coupled to the spacer P. Methods for covalent or non-covalent conjugation are known by persons skilled in the art and the same as mentioned for conjugation of the detection moiety X.

The method of the invention is especially useful for detection and/or isolation of specific cell types from complex mixtures and may comprise more than one sequential or parallel sequences of the steps a)-e). The method may use a variety of combinations of conjugates. For example, a conjugate may comprise antibodies specific for two different epitopes, like two different anti-CD34 antibodies. Different antigens may be addressed with different conjugates comprising different antibodies, for example, anti-CD4 and anti-CD8 for differentiation between two distinct T-cell-populations or anti-CD4 and anti-CD25 for determination of different cell subpopulations like regulatory T-cells.

Enzymes

The choice of enzyme as release agent is determined by the chemical nature of the enzymatically degradable spacer P and can be one or a mixture of different enzymes. Enzymes are preferably hydrolases, but lyases or reductases are also possible. For example, if the spacer P is a polysaccharide, glycosidases (EC 3.2.1) are most suitable as release agents. Preferred are glycosidases that recognize specific glycosidic structures, e.g., dextranase (EC3.2.1.11), which cleaves at the α(1->6) linkage of dextrans, pullulanases, which cleave either α (1->6) linkages (EC 3.2.1.142) or α (1->6) and α (1->4) linkages (EC 3.2.1.41) of *pullulans*, neopullulanase (EC 3.2.1.135), and isopullulanase (EC 3.2.1.57), which cleave α (1->4) linkages in *pullulans*. α-Amylase (EC 3.2.1.1), and maltogenic amylase (EC 3.2.1.133), which cleave α(1->4) linkages in amylose, inulinase (EC 3.2.1.7), which cleaves β(2->1) fructosidic linkages in inulin, cellulase (EC 3.2.1.4), which cleaves at the β(1->4) linkage of cellulose, xylanase (EC 3.2.1.8), which cleaves at the β(1->4) linkages of xylan, pectinases such as endo-pectin lyase (EC 4.2.2.10), which cleaves eliminative at the α (1->4) D-galacturonan methyl ester linkages, or polygalacturonase (EC 3.2.1.15), which cleaves at the α(1->4) D-galactosiduronic linkages of pectin, chitosanase (EC 3.2.1.132), which cleaves at the β(1->4) linkages of chitosan and endo-chitinase (EC 3.2.1.14) for cleaving of chitin.

Proteins and peptides may be cleaved by proteinases, which need to be sequence specific to avoid degradation of target structures on cells. Sequence specific proteases are for instance TEV protease (EC 3.4.22.44), which is a cysteine protease cleaving at the sequence ENLYFQ\S, enteropeptidase (EC 3.4.21.9), which is a serine protease cleaving after the sequence DDDDK, factor Xa (EC 3.4.21.6), which is a serine endopeptidase cleaving after the sequences IEGR or IDGR, or HRV3C protease (EC3.4.22.28), which is a cysteine protease cleaving at the sequence LEVLFQ\GP.

Depsipeptides, which are peptides containing ester bonds in the peptide backbone, or polyesters may be cleaved by esterases, such as porcine liver esterase (EC 3.1.1.1) or porcine pancreatic lipase (EC 3.1.1.3). Nucleic acids may be cleaved by endonucleases, which can be sequence specific, such as restriction enzymes (EC 3.1.21.3, EC 3.1.21.4, EC 3.1.21.5), such as EcoRI, HindII or BamHI or more general such as DNAse I (EC 3.1.21.1), which cleaves phosphodiester linkages adjacent to a pyrimidine.

The amount of enzyme added needs to be sufficient to degrade substantially the spacer in the desired period of time. Usually the detection signal is at least about 80%, more usually at least about 95%, preferably at least about 99% reduced. The conditions for release may be empirically optimized in terms of temperature, pH, presence of metal cofactors, reducing agents, etc. The degradation will usually be completed in at least about 15 minutes, more usually at least about 10 minutes, and will usually not be longer than about 30 minutes.

Cell Detection Methods

The method and equipment to detect the target labelled with the conjugate of the invention is determined by the detection moiety X.

In one variant of the invention the detection moiety X is a fluorescent moiety. Targets labelled with fluorochrome-conjugate are detected by exciting the fluorescent moiety X and analysing the resulting fluorescence signal. The wavelength of the excitation is usually selected according to the absorption maximum of the fluorescent moiety X and provided by LASER or LED sources as known in the art. If several different detection moieties X are used for multiple colour/parameter detection, care should be taken to select fluorescent moieties having not overlapping absorption spectra, at least not overlapping absorption maxima. In case of a fluorescent moieties as detection moiety the targets may be detected, e.g., under a fluorescence microscope, in a flow cytometer, a spectrofluorometer, or a fluorescence scanner. Light emitted by chemiluminescence can be detected by similar instrumentation omitting the excitation.

In another variant of the invention the detection moiety is a light absorbing moiety, which is detected by the difference between the irradiation light intensity and the transmitted or reflected light intensity. Light absorbing moieties might also be detected by photoacoustic imaging, which uses the absorption of a pulsed laser beam to generate an acoustic like an ultrasonic signal.

Radioactive detection moieties are detected though the radiation emitted by the radioactive isotopes. Suitable instrumentation for detection of radioactive radiation include, for example, scintillation counters. In case of beta emission electron microscopy can also be used for detection.

Transition metal isotope mass tag moieties are detected by mass spectrometric methods such as ICP-MS, which is integrated in mass cytometry instrumentation.

Use of the Method

The method of the invention can be used for various applications in research, diagnostics and cell therapy.

In a first variant of the invention, biological specimens like cells are detected for counting purposes i.e. to establish the amount of cells from a sample having a certain set of antigens recognized by the antigen recognizing moieties of the conjugate.

In a second variant, one or more populations of biological specimens are detected from the sample and separated as target cells. This variant may be used for purification of target cells, for example, in clinical research, diagnostics, and immunotherapy. In this variant, one or more sorting steps may be performed after any of the steps a), b), c), d) and optionally washing step e).

In another variant of the invention, the location of the target moieties like antigens on the biological specimens recognized by the antigen recognizing moieties of the conjugate is determined. Such techniques are known as "Multi Epitope Ligand Cartography", "Chip-based Cytometry" or "Multioymx" and are described, for example, in EP 0810428, EP1181525, EP 1136822 or EP1224472. In this technology, cells are immobilized and contacted with antibodies coupled to fluorescent moiety. The antibodies are recognized by the respective antigens on the biological specimen (for example on a cell surface) and after removing the unbound marker and exciting the fluorescent moieties, the location of the antigen is detected by the fluorescence emission of the fluorescent moieties. In certain variants, instead of antibodies coupled to fluorescent moieties, antibodies coupled to moieties detectable for MALDI-Imaging or CyTOF can be used. The person skilled in the art is aware how to modify the technique based on fluorescent moiety to work with these detection moieties.

The location of the target moieties is achieved by a digital imaging device with a sufficient resolution und sensitivity in for the wavelength of the fluorescence radiation. The digital imaging device may be used with or without optical enlargement for example with a fluorescence microscope. The resulting images are stored on an appropriate storing device like a hard drive, for example in RAW, TIF, JPEG, or HDF5 format.

In order to detect different antigens, different antibody-conjugates having the same or different fluorescent moiety or antigen recognizing moiety Y can be provided. Since the parallel detection of fluorescence emission with different wavelengths is limited, the antibody-fluorochrome-conjugates are utilized sequentially individually or in small groups (2-10) after the other.

In yet another variant of the method according to the invention, the biological specimens—especially suspension cells—of the sample are immobilized by trapping in microcavities or by adherence.

The invention claimed is:

1. A conjugate having the general formula (I)

$$X_n\text{-}P\text{-}Y_mB_o \quad (I)$$

with X is an detection moiety,
P is a spacer unit,
Y an antigen recognizing moiety,
B an oligonucleotide comprising 2 to 100 nucleotide residues
and n, m, o are independent integers between 1 and 100
wherein P and B are covalently bound to Y and X is covalently bound to P and wherein X is erasable by eliminating the fluorescence emission of the detection moiety through radiation or enzymatic degradation of the spacer unit P, and wherein the antigen recognizing moiety Y and/or the oligonucleotide B comprises a crosslinker unit as a functional group that forms a covalent bond with the antigen recognized by the antigen recognizing moiety Y.

2. The conjugate according to claim 1 characterized in that the spacer unit P is enzymatic degradable.

3. The conjugate according to claim 1, characterized in that that the covalent bond of the crosslinker to an antigen is initiated by radiation or enzymatic reaction.

4. The conjugate according to claim 1, characterized in that the detection moiety is selected from the group consisting of chromophore moiety, fluorescent moiety, phosphorescent moiety, luminescent moiety, light absorbing moiety, radioactive moiety, transition metal and isotope mass tag moiety.

5. The conjugate according to claim 1, characterized in that the enzymatically degradable spacer P is selected from the group consisting of polysaccharides, proteins, peptides, depsipeptides, polyesters, nucleic acids, and derivatives thereof.

6. The conjugate according to claim 1, characterized in that the antigen recognizing moiety Y is an antibody, an fragmented antibody, an fragmented antibody derivative, peptide/MHC-complexes targeting TCR molecules, cell adhesion receptor molecules, receptors for costimulatory molecules or artificial engineered binding molecules.

7. A library of conjugates according to claim 1, comprising at least 10000 conjugates provided with oligonucleotide B having nucleotide sequences that differ by at least one nucleotide.

8. A method for detecting a target moiety on a cell by:
a) providing at least one conjugate having the general formula (I)

$$X_n\text{-}P\text{-}Y_mB_o \quad (I)$$

with X is an detection moiety,
P is a spacer unit,
Y an antigen recognizing moiety,
B an oligonucleotide comprising 2 to 100 nucleotide residues
and n, m, o are independent integers between 1 and 100
wherein P and B are covalently bound to Y and X is covalently bound to P and wherein X is erasable; and
b) contacting the sample of biological specimens with the at least one conjugate, thereby labelling the target moiety recognized by the antigen recognizing moiety Y
c) detecting the target moiety labelled with the conjugate with the detecting moiety X d) isolating the cell labelled with the conjugate with the detecting moiety X e) erasing detection moiety X, by eliminating the fluorescence emission of the detection moiety through radiation or enzymatic degradation of the spacer unit P, and wherein the antigen recognizing moiety Y and/or the oligonucleotide B comprises a crosslinker unit as a functional group that forms a covalent bond with the antigen recognized by the antigen recognizing moiety Y.

9. The method according to claim 8 characterized in that the detection moiety X is erased by radiation or by enzymatic degradation of spacer unit P.

10. The method according to claim 8 characterized in that that the antigen recognizing moiety Y and/or the oligonucleotide B is provided with a crosslinker unit capable of providing a covalent bound to the antigen recognized by antigen recognizing moiety Y and that the covalent bound of the crosslinker to the antigen is initiated by radiation or enzymatic reaction.

11. The method according to claim 8 characterized in that steps a) to e) are repeated subsequently at least with two conjugates having different antigen recognizing moieties Y.

12. The method according to claim 8 characterized in that steps a) to e) are repeated subsequently at least with two conjugates having different antigen recognizing moieties Y and different oligonucleotides B.

* * * * *